UNITED STATES PATENT OFFICE.

JOHN E. PHILLIPS, OF PHILADELPHIA, PENNSYLVANIA.

IMPROVEMENT IN PREPARING WISPS FOR BROOMS.

Specification forming part of Letters Patent No. 54,591, dated May 8, 1866; antedated January 11, 1866.

*To all whom it may concern:*

Be it known that I, JOHN E. PHILLIPS, of Philadelphia, Pennsylvania, have invented a new and useful Improvement in the Mode of Preparing Wisps or Brushes for Broom-Heads; and I do hereby declare that the following is a full and exact description thereof.

My invention relates to the preparation of the wisp or brush for filling broom-heads, holders, or frames, such as are intended for repeated filling as often as the same may become worn out.

I will now proceed to describe the process or mode of preparing my improved wisp for the market as a new article of manufacture.

To prepare the brush or wisp for my broom-head patented July 4, 1865, I take two bunches of broom-corn of sufficient size to fill the two receptacles or chambers of the broom-head, and after adjusting the several brush ends evenly I cut off the interior stalks and turn down the surrounding exterior stalks, (the latter being shaved off or thinned by a knife,) so as to cover over and give a smooth finish to the top ends of the wisps. In this condition the wisps are dampened and placed in a die, mold, or press, and after being subjected some time to sufficient pressure to retain the proper form to suit any of the various receptacles known as "broom-heads" or "clamps," the wisp is removed from the die or mold, and the ends which are to be placed in the broom-head are slightly opened or separated, and a preparation of glutinous material intermixed with a sharp granular material is applied thereto. After the application of the glutinous and granular preparation the wisps may be again subjected to sufficient pressure to cause them to retain the proper form, and for a period of time sufficient for the cement to harden.

Wisps of any form corresponding with the structure of the various broom or brush holders may be thus prepared and furnished in parcels for the market.

Wisps may be prepared, as I have found from experiment, by simply dampening and compressing them into suitable form; but in using the wisps in some of the different structures of broom-head, unless the mass is firmly cemented there is liability of the separate stalks falling out, and thereby loosening the entire mass or brush.

I have also found from experiment that the use of any of the well-known glutinous materials or cements alone cannot be relied upon to hold the stalks tightly in a mass or wisp. The difficulty arises from the peculiar hard and glossy nature of the surface of the stalks of broom-corn. When glues or cements are applied to a mass of these stalks in a heated condition, such as is necessary in the use of these materials, after it becomes cold and hard the stalks may be easily removed from the mass, leaving the cement in the form of a mold.

To obviate this difficulty I have intermixed with any of the well-known glutinous materials sharp granular material, such as refuse of a cupel, or sand, or other analogous material. This composition being applied to the wisp, which is afterward subjected to pressure, will cause the mass to adhere, because the granular material will act as teeth, making indentations in the polished surface of the cornstalks, and prevent the stalks from being easily removed separately from the mass.

It is obvious that many different ingredients of the nature and character of those named above may be used to accomplish the object of my invention. It is also apparent that the wisp may be formed and finished upon its exterior in different ways; but the leading object of my invention is to furnish to the market a new article of manufacture, consisting of a wisp or brush of suitable form to be inserted in and fit the broom heads or holders designed to be refilled from time to time, and so combined and attached in a mass that the wisps may be put on sale in packages or otherwise, and retain their proper forms by the use of the ingredients herein described, or any analogous means and process.

It is now well known that some of the broom heads or clamps in use cannot be filled with broom-corn in a detached and separate condition with ease and facility. The use of my invention will obviate this objection to the introduction of such clamps.

Having thus fully described my new process and means of preparing wisps for broom heads or holders, what I claim, and desire to secure by Letters Patent, is—

The herein-described new article of manufacture, consisting of a wisp for filling broom heads or clamps, constructed in the manner and retained in form by the means herein described, or any equivalent means, substantially as set forth.

Subscribed by me this 4th day of November, 1865.

JOHN EDWARD PHILLIPS.

Witnesses:
NELSON GATES,
H. P. K. PECK.